(12) United States Patent
Rausch

(10) Patent No.: US 11,731,335 B2
(45) Date of Patent: Aug. 22, 2023

(54) MULTI-COMPONENT EXTRUSION DIE HEAD, MULTI-COMPONENT EXTRUSION SYSTEM AND METHOD FOR PRODUCING A COMPOSITE TUBE

(71) Applicant: DELFINGEN FR-ANTEUIL S.A., Anteuil (FR)

(72) Inventor: Hubert Rausch, Königsberg (DE)

(73) Assignee: DELFINGEN FR-ANTEUIL S.A., Anteuil (FR)

( * ) Notice: Subject to any disclaimer, the term of this patent is extended or adjusted under 35 U.S.C. 154(b) by 829 days.

(21) Appl. No.: 16/494,015

(22) PCT Filed: Feb. 7, 2018

(86) PCT No.: PCT/EP2018/053099
§ 371 (c)(1),
(2) Date: Sep. 13, 2019

(87) PCT Pub. No.: WO2018/166722
PCT Pub. Date: Sep. 20, 2018

(65) Prior Publication Data
US 2021/0008780 A1    Jan. 14, 2021

(30) Foreign Application Priority Data
Mar. 17, 2017    (DE) .................... 10 2017 105 807.9

(51) Int. Cl.
*B29C 48/695*    (2019.01)
*B29C 48/19*    (2019.01)
(Continued)

(52) U.S. Cl.
CPC ............ *B29C 48/695* (2019.02); *B29C 48/09* (2019.02); *B29C 48/13* (2019.02); *B29C 48/17* (2019.02);
(Continued)

(58) Field of Classification Search
CPC .......... B29C 48/09; B29C 48/13; B29C 48/17; B29C 48/19; B29C 48/20; B29C 48/304;
(Continued)

(56) References Cited

U.S. PATENT DOCUMENTS 2,808,617 A * 10/1957 Terracini et al. ....... B29C 48/19
425/462
3,106,746 A * 10/1963 Sunday ................... B29C 48/09
425/207
(Continued)

FOREIGN PATENT DOCUMENTS

CN    86106613 A    7/1987
CN    1491158 A    4/2004
(Continued)

OTHER PUBLICATIONS

China National Intellectual Property Administration, Office Action and Search Report Issued in Application No. 201880018200.6, dated Oct. 15, 2021, 23 pages.
(Continued)

*Primary Examiner* — Xiao S Zhao
*Assistant Examiner* — Joseph S Leyson
(74) *Attorney, Agent, or Firm* — Alleman Hall Creasman & Tuttle LLP

(57) ABSTRACT

A multi-component extrusion die head for producing a composite tube comprises an extrusion nozzle, a main die head, and a melt flow distributor device. The main die head is configured to supply the extrusion nozzle with a first melt flow and a second melt flow, which are guided separately from one anther in the extrusion nozzle away from the main die head and toward a nozzle outlet of the extrusion nozzle. The melt flow distributor device is arranged in the extrusion nozzle outside of the main die head and is configured to split the first melt flow in a peripheral direction thereof, and to
(Continued)

supply the second melt flow to the first melt flow such that at least one section of the second melt flow is arranged within the first melt flow in the peripheral direction.

13 Claims, 13 Drawing Sheets

(51) Int. Cl.
  *B29C 48/20* (2019.01)
  *B29C 48/09* (2019.01)
  *B29C 48/32* (2019.01)
  *B29C 48/70* (2019.01)
  *B29C 48/17* (2019.01)
  *B29C 48/21* (2019.01)
  *B29C 48/13* (2019.01)
  *B29C 48/49* (2019.01)
  *B29C 48/25* (2019.01)
  *B29C 48/30* (2019.01)
  *B29C 48/10* (2019.01)
  *B29C 48/12* (2019.01)
  *B29L 23/18* (2006.01)
  *B29L 23/00* (2006.01)

(52) U.S. Cl.
  CPC .............. *B29C 48/19* (2019.02); *B29C 48/20* (2019.02); *B29C 48/21* (2019.02); *B29C 48/25686* (2019.02); *B29C 48/304* (2019.02); *B29C 48/32* (2019.02); *B29C 48/49* (2019.02); *B29C 48/70* (2019.02); *B29C 48/10* (2019.02); *B29C 48/12* (2019.02); *B29L 2023/18* (2013.01); *B29L 2023/22* (2013.01)

(58) Field of Classification Search
  CPC ......... B29C 48/32; B29C 48/49; B29C 48/70; B29C 48/705; B29C 48/71; B29L 2023/22; B29L 2023/005
  See application file for complete search history.

(56) References Cited

U.S. PATENT DOCUMENTS

| | | | |
|---|---|---|---|
| 3,825,036 A * | 7/1974 | Stent | B29C 48/10 264/209.1 |
| 4,933,134 A | 6/1990 | Jarvenkyla et al. | |
| 5,036,210 A | 7/1991 | Soodman | |
| 7,163,388 B2 | 1/2007 | Anand et al. | |
| 2004/0129331 A1 | 7/2004 | Duarte et al. | |
| 2004/0183224 A1 | 9/2004 | Balzer et al. | |
| 2005/0260374 A1 | 11/2005 | Anand et al. | |
| 2017/0141553 A1 | 5/2017 | Chu et al. | |
| 2018/0048131 A1 | 2/2018 | Chu | |

FOREIGN PATENT DOCUMENTS

| | | |
|---|---|---|
| CN | 1839026 A | 9/2006 |
| CN | 101001737 A | 7/2007 |
| CN | 201226278 Y | 4/2009 |
| CN | 203460421 U | 3/2014 |
| CN | 204054602 U | 12/2014 |
| CN | 105082512 A | 11/2015 |
| CN | 105829047 A | 8/2016 |
| DE | 102006020375 A1 | 11/2007 |
| DE | 102014108757 A1 | 12/2015 |
| DE | 102015104256 A1 | 9/2016 |
| EP | 1459866 A1 | 9/2004 |
| JP | 9-309142 A | 12/1997 |
| KR | 20010034163 A | 4/2001 |
| WO | 02087048 A1 | 10/2002 |

OTHER PUBLICATIONS

Japan Patent Office, Office Action Issued in Application No. 2019572280, dated Jul. 28, 2020, 8 pages.
Korean Intellectual Property Office, Office Action Issued in Application No. 10-2019-7029899, dated Nov. 20, 2020, Korea, 18 Pages.
Brazilian National Institute of Industrial Property, Search Report Issued in Application No. 112019018598-4, dated Apr. 27, 2022, 4 pages.
China National Intellectual Property Administration, Office Action and Search Report Issued in Application No. 201880018200.6, dated Jan. 22, 2021, 23 pages.

* cited by examiner

MULTI-COMPONENT EXTRUSION DIE HEAD, MULTI-COMPONENT EXTRUSION SYSTEM AND METHOD FOR PRODUCING A COMPOSITE TUBE

FIELD

The present invention relates to a multi-component extrusion die head, a multi-component extrusion system with such a multi-component extrusion die head, and a method for producing a composite tube.

BACKGROUND

Corrugated tubes or corrugated pipes can in particular be used in automotive engineering as protective conduits for cables, such as electrical lines. For assembly, the cables are pulled, pushed or laid into the corrugated tube.

DE 10 2015 104 256 A1 describes a corrugated pipe made of plastic for sheathing lines. Along its outer periphery, the corrugated pipe comprises a corrugation with radially protruding regions and with regions shifted inward with respect to the radially protruding regions. The radially protruding regions consist of a harder plastic material than the regions shifted radially inward. By means of the softer plastic material, the flexibility of the corrugated pipe can be adjusted, and the wear properties thereof can be adjusted by means of the harder plastic material.

In order to be able to use various plastic materials, the use of a multi-component extrusion system is required. In such multi-component extrusion systems, the two differing plastic materials are combined in a main die head of the multi-component extrusion system.

SUMMARY

With this as the background, an object of the present invention consists in providing an improved multi-component extrusion die head.

Accordingly, a multi-component extrusion die head for producing a composite tube is proposed. The multi-component extrusion die head comprises an extrusion nozzle, a main die head configured for supplying the extrusion nozzle with a first melt flow and a second melt flow, wherein the first melt flow and the second melt flow are guided separately from one another in the extrusion nozzle in a conveying direction oriented away from the main die head in the direction of a nozzle outlet of the extrusion nozzle, and a melt flow distributor device, which is arranged in the extrusion nozzle and outside the main die head and which is configured for splitting the first melt flow in a peripheral direction thereof and which is configured for supplying the second melt flow to the split first melt flow in such a way that at least one section of the second melt flow is arranged within the first melt flow in the peripheral direction.

As a result of the melt flow distributor device not being arranged within the main die head, it can be exchanged particularly quickly and easily. By means of the melt flow distributor device, optimal material guidance and optimal material distribution result. Short resident times of the plastic materials used in the multi-component extrusion die head result. The easy exchange of the melt flow distributor device results in various possibilities of extruding several plastic materials axially.

The melt flow distributor device is in particular arranged at a distance from the main die head. The multi-component extrusion die head may, for example, be a two-component extrusion die head or a three-component extrusion die head. The multi-component extrusion die head is in particular suitable for producing a corrugated tube or corrugated pipe. To this end, a corrugator may be arranged downstream of the nozzle outlet as viewed in the conveying direction. The multi-component extrusion die head may however also be suitable for producing a smooth tube, smooth pipe or any other profile.

The first melt flow is formed with a first plastic material, and the second melt flow is formed with a second plastic material. The first plastic material may also be called the primary component, and the second plastic material may also be called the secondary component. The first plastic material and the second plastic material differ from one another. For example, the first plastic material and the second plastic material differ chemically from one another. Alternatively, the first plastic material and the second plastic material may also only have different colors. More than two different plastic materials may also be processed by means of the multi-component extrusion die head. For example, the main die head may then be suitable for supplying the extrusion nozzle with a first melt flow, a second melt flow and a third melt flow. The number of the plastic materials used and thus of the melt flows is not limited.

The extrusion nozzle preferably comprises an outer nozzle and an inner nozzle arranged within the outer nozzle. The outer nozzle and the inner nozzle are designed to be rotation-symmetrical with respect to an axis of symmetry. The outer nozzle may be connected to a nozzle holder of the main die head. For example, the outer nozzle may be screwed into the nozzle holder. The inner nozzle is preferably screwed to the main die head by means of a mounting element, a mounting rod and the melt flow distributor device. The first melt flow is preferably guided between the outer nozzle and the inner nozzle, and the second melt flow is preferably guided between the inner nozzle and the mounting rod.

The main die head preferably comprises a base body, in which a rotation-symmetrical bore is provided. A so-called torpedo may be arranged in the bore. The torpedo comprises a conical melt distributor, which is configured for splitting the first melt flow and for supplying it to the outer nozzle. The torpedo furthermore comprises a distributor plate, by means of which the second melt flow is supplied to the inner nozzle. That is to say, the second melt flow is guided in the conveying direction within the first melt flow in the direction of the melt flow distributor device.

The first melt flow being split in the peripheral direction thereof is to be understood to mean that it is split at least by one gap extending in the conveying direction. That is to say, the first melt flow is then not closed peripherally. Within the extrusion nozzle and directly before the nozzle outlet, the section of the second melt flow is fed into the gap of the first melt flow by means of the melt flow distributor device. That is to say, the gap provided in the first melt flow is immediately closed by means of the section of the second melt flow.

The first melt flow is preferably split into a plurality of sections by means of the melt flow distributor device. As viewed in the peripheral direction, one section of the second melt flow is then in particular always arranged between two section of the first melt flow and vice versa. The section of the second melt flow being arranged within the first melt flow in the peripheral direction of the first melt flow is to be understood to mean that the split first melt flow is arranged on both sides of the section of the second melt flow. As viewed in a radial direction of the first melt flow, the melt flows are in particular not arranged one above the other but are positioned next to one another and in parallel to one another as viewed in the peripheral direction of the first melt flow. That is to say, the second melt flow is in particular arranged outside the first melt flow and/or vice versa as viewed in the radial direction. The first melt flow and the second melt flow in particular do not mix.

According to one embodiment, the melt flow distributor device is arranged in or on the nozzle outlet.

That is to say, the melt flow distributor device can be arranged at any distance from the main die head. As a result, the melt flow distributor device can be exchanged particularly easily.

According to another embodiment, a front side of the melt flow distributor device is flush with the nozzle outlet.

The front side of the melt flow distributor device is preferably part of the nozzle exit. The front side faces away from the main die head. The melt flow distributor device is in particular positioned within the outer nozzle.

According to another embodiment, a mounting element which can be reached from the nozzle outlet is provided in the melt flow distributor device, wherein the melt flow distributor device can be removed from the extrusion nozzle after releasing the mounting element.

The melt flow distributor device preferably comprises a base body which is constructed to be rotation-symmetrical with respect to an axis of symmetry and in which a receiving region in the form of a bore is provided. The mounting element can be received in the receiving region. The mounting element may, for example, have an internal thread, which is designed to correspond to an external thread of the mounting rod. The mounting element may furthermore have a mounting section. The mounting section may, for example, be a hexagon socket. As a result, the melt flow distributor device can be exchanged easily and quickly. Disassembling the main die head is not necessary in order to disassemble and assemble the melt flow distributor device.

According to another embodiment, the melt flow distributor device is mounted to the main die head by means of the mounting element and a mounting rod passed through the extrusion nozzle.

The mounting rod is preferably screwed into the distributor plate of the torpedo of the main die head. The second melt flow is guided between the mounting rod and the inner nozzle. In its base body, the melt flow distributor device preferably comprises a central bore in which the mounting rod is received.

According to another embodiment, the melt flow distributor device has at least one melt distributor, which is configured for splitting the first melt flow in the peripheral direction thereof.

The number of melt distributors is arbitrary. For example, twelve melt distributors may be provided. However, only one, two, three or any number of melt distributors may also be provided. Preferably provided is a plurality of melt distributors, which distribute the first melt flow into a plurality of sections. The melt distributors may also be called islands. The melt distributors contact the outer nozzle on the inside.

According to another embodiment, the at least one melt distributor has a front edge as well as two side walls extending from the front edge in the conveying direction away from one another.

The side walls are preferably arranged in a V shape. The side walls may be straight. Alternatively, the side walls may also be curved in an arc shape. The first melt flow is split by means of the front edge and the side walls. The distribution of the first melt flow starts at the front edge. The obliquely arranged side walls guide apart the first melt flow such far that the section of the second melt flow can be placed within the split first melt flow. The front edge is preferably positioned orthogonally to an axis of symmetry of the melt flow distributor device. The front edge may however also be positioned at an incline in relation to the axis of symmetry.

According to another embodiment, the at least one melt distributor has a rear wall in the shape of an arc, in particular a circular arc.

That is to say, the rear wall is curved. As viewed in the conveying direction, the rear wall is arranged downstream of the front edge. The rear wall may also be designed to be flat or V-shaped. Between the rear wall and the obliquely arranged side walls are preferably arranged two further side walls positioned in parallel to one another. The rear wall is in particular cylindrical. The at least one melt distributor preferably also has an outer surface curved in the shape of a circular arc. With this outer surface, the at least one melt distributor can abut against the outer nozzle on the inside. That is to say, the first melt flow preferably cannot flow past between the outer surface of the melt distributor and the outer nozzle.

According to another embodiment, the melt flow distributor device has at least one bore, which is configured for supplying the second melt flow to the split first melt flow.

The at least one bore may also be called a channel or be a channel. The at least one bore is in particular arranged obliquely. For example, the at least one bore is positioned at an angle of inclination of 30° to 50°, preferably 35° to 45°, more preferably 40°, in relation to the axis of symmetry of the melt flow distributor device. A plurality of bores distributed evenly about a periphery of the melt flow distributor device is preferably provided. In particular, such a bore is assigned to each melt distributor. By means of the bores, the second melt flow is supplied to the first melt flow. The bores are oriented from a frustoconical melt diverting section of the base body of the melt flow distributor device in the direction of an outer surface of the base body.

According to another embodiment, the at least one bore passes through the at least one melt distributor at least in sections.

The at least one bore preferably penetrates through the at least one melt distributor. The bore in particular penetrates through the rear side of the at least one melt distributor. As a result, the section of the second melt flow can be supplied to the first melt flow immediately after the at least one melt distributor. As a result, mixing of the first melt flow and the second melt flow is reliably prevented.

A multi-component extrusion system with such a multi-component extrusion die head, a main extruder for supplying the first melt flow to the main die head and an ancillary extruder for supplying the second melt flow to the main die head is moreover proposed.

The multi-component extrusion system may have a plurality of ancillary extruders. For example, a different plastic material can be supplied to the main die head by means of each ancillary extruder. The multi-component extrusion system may comprise the aforementioned corrugator.

A method for producing a composite tube by means of a multi-component extrusion die head is also proposed. The method comprises the following steps: Supplying a first melt flow and a second melt flow to an extrusion nozzle by means of a main die head, separately guiding the first melt flow and the second melt flow in the extrusion nozzle in a conveying direction oriented away from the main die head in the direction of a nozzle outlet of the extrusion nozzle, splitting the first melt flow in a peripheral direction thereof by means of a melt flow distributor device arranged in the extrusion nozzle and outside the main die head, and supplying the second melt flow to the split first melt flow by means of the melt flow distributor device in such a way that at least one section of the second melt flow is arranged within the first melt flow in the peripheral direction.

The at least one section of the second melt flow being arranged within the first melt flow in the peripheral direction is understood to mean that the at least one section of the second melt flow is enclosed on both sides by the first melt flow as viewed in the peripheral direction. As viewed in the radial direction of the first melt flow, the first melt flow and the second melt flow are in particular not positioned one above the other. This means in particular that as viewed in the radial direction, the section of the second melt flow is arranged outside the first melt flow. Splitting the first melt flow and supplying the second melt flow to the first melt flow may take place simultaneously. The first melt flow is, for example, supplied to the main die head by means of the main extruder, and the second melt flow may be supplied to the main die head by means of the ancillary extruder. The first melt flow comprises the first plastic material, and the second melt flow comprises the second plastic material. For example, the second plastic material is softer than the first plastic material.

According to one embodiment, the at least one section of the second melt flow is arranged in the peripheral direction between two sections of the first melt flow.

Preferably provided are at least two melt distributors, which are configured for splitting the first melt flow into two sections, between which a section of the second melt flow is respectively arranged. The number of melt distributors is however arbitrary. More than two melt distributors are preferably provided. For example, twelve melt distributors, which distribute the first melt flow into twelve sections, may be provided. One section of the first melt flow and one section of the second melt flow are then preferably arranged alternately next to one another in the peripheral direction.

According to another embodiment, the first melt flow has a plurality of sections and the second melt flow has a plurality of sections, wherein the sections of the first melt flow and the sections of the second melt flow are arranged alternately in the peripheral direction in such a way that one section of the first melt flow is always arranged between two sections of the second melt flow and vice versa.

The number of sections of the first melt flow and the number of sections of the second melt flow are arbitrary. The number of sections of the first melt flow preferably matches the number of sections of the second melt flow.

According to another embodiment, the first melt flow is split in such a way and the second melt flow is supplied to the split first melt flow in such a way that the sections of the first melt flow and of the second melt flow respectively extend in a radial direction of the composite tube over a total wall thickness thereof.

This is to be understood to mean that as viewed in the radial direction, the sections of the first melt flow and the sections of the second melt flow are not arranged one above the other. The sections of the first melt flow are in particular free of the second plastic material of the second melt flow, and the sections of the second melt flow are in particular free of the first plastic material of the first melt flow.

Additional possible implementations of the multi-component extrusion die head, of the multi-component extrusion system and/or of the method also comprise not explicitly mentioned combinations of features or embodiments described above or below with respect to the exemplary embodiments. In this respect, the person skilled in the art will also add individual aspects as improvements or additions to the respective basic form of the multi-component extrusion die head, of the multi-component extrusion system and/or of the method.

Additional advantageous embodiments and aspects of the multi-component extrusion die head, of the multi-component extrusion system and/or of the method are the subject matter of the dependent claims and of the below-described exemplary embodiments of the multi-component extrusion die head, of the multi-component extrusion system and/or of the method. The multi-component extrusion die head, the multi-component extrusion system and/or the method are explained in more detail below with reference to the enclosed figures.

DETAILED DESCRIPTION

Unless otherwise indicated, identical or functionally identical elements are provided with the same reference signs in the figures.

Figure 1:
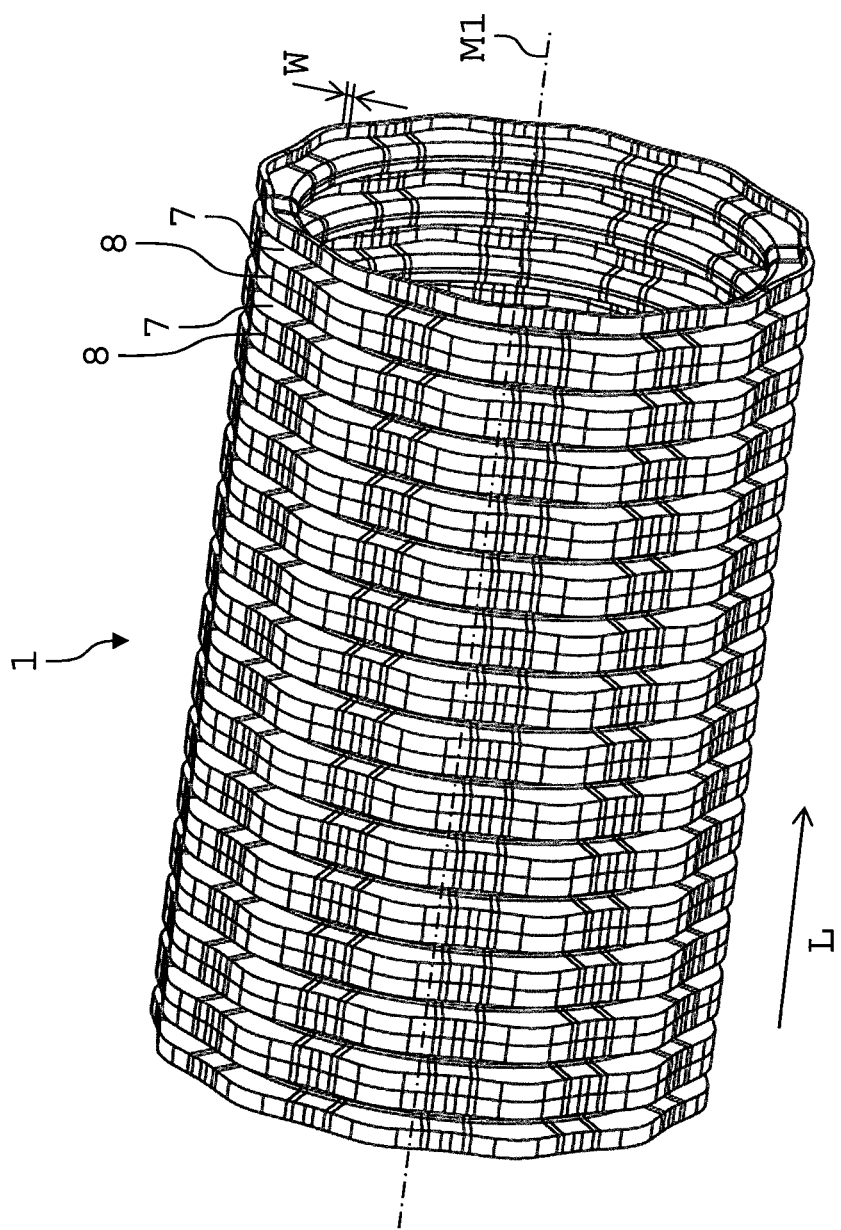
FIG. 1 shows a schematic perspective view of an embodiment of a composite tube.
Figure 2:
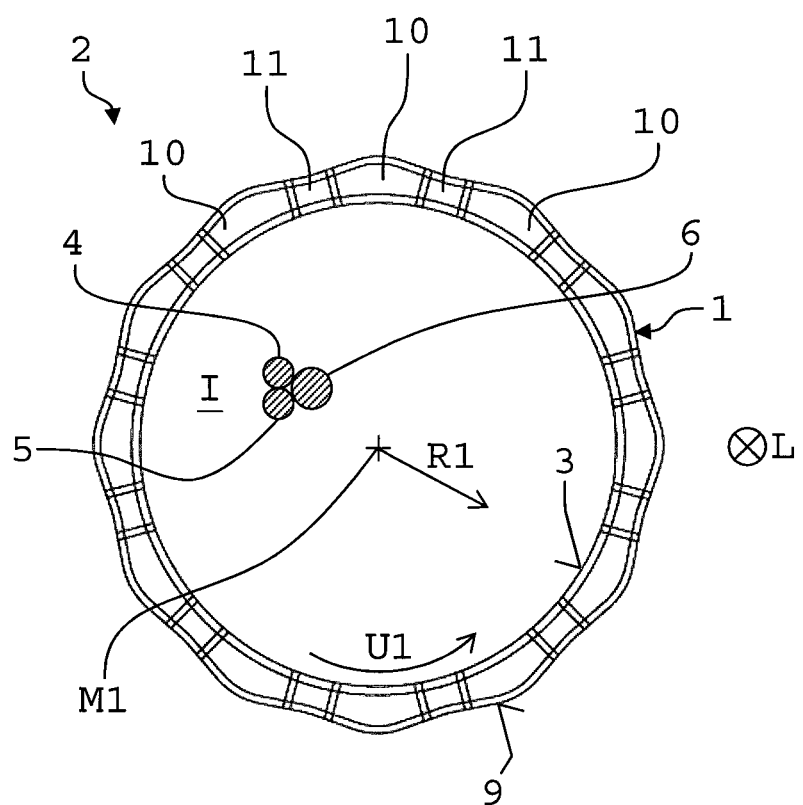
FIG. 2 shows a schematic front view of a wiring harness with a composite tube according to FIG. 1.

FIG. 1 shows a schematic perspective view of an embodiment of a composite tube 1. FIG. 2 shows a schematic front view of an embodiment of a wiring harness 2 with such a composite tube 1. The composite tube 1 may also be called composite pipe. The composite tube 1 is called composite tube since it is manufactured from different plastic materials connected to one another. The plastic materials preferably differ chemically from one another. The composite tube 1 is in particular a corrugated tube or corrugated pipe or may also be called a corrugated tube or corrugated pipe. The composite tube 1 may also be a smooth tube.

The composite tube 1 may be designed to be rotation-symmetrical with respect to a center axis or axis of symmetry M1. The composite tube 1 has a longitudinal direction L. The longitudinal direction L is oriented in parallel to the axis of symmetry M1. The longitudinal direction L may be oriented in the orientation of FIG. 1 from left to right or from right to left. The longitudinal direction L in FIG. 1 is oriented from left to right.

The composite tube 1 furthermore has a radial direction R1, which is oriented away from the axis of symmetry M1. The radial direction R1 is positioned orthogonally to the axis of symmetry M1. The radial direction R1 is in particular oriented away from the axis of symmetry M1 toward an inner wall 3 of the composite tube 1.

The composite tube 1 furthermore has a peripheral direction U1, which may be oriented clockwise or counterclockwise. As FIG. 2 shows, the peripheral direction U1 may be oriented counterclockwise. The peripheral direction U1 is preferably oriented in parallel to the inner wall 3. The peripheral direction U1 may also be called the peripheral direction of the composite tube 1.

The composite tube 1 is in particular suitable for producing the wiring harness 2 shown in FIG. 2. To this end, a plurality of cables 4 to 6 are received in the composite tube 1, in particular in an internal space I of the composite tube 1. For example, the cables 4 to 6 fill the entire internal space I. The cables 4 to 6 may be called lines. The number of cables 4 to 6 is arbitrary. The cables 4 to 6 may have identical or different diameters and/or cross-sections as shown in FIG. 2. Together with the composite tube 1, the cables 4 to 6 form the wiring harness 2.

The wiring harness 2, or the composite tube 1, is preferably used in the field of motor vehicle technology. The wiring harness 2, or the composite tube 1, may however also be used in any other field. The cables 4 to 6 may be electrical cables, such as single-phase cables, multi-phase cables, coaxial cables, or the like, or fluid lines, such as fuel lines, diesel lines, kerosene lines, hydraulic lines, or pneumatic lines. The cables 4 to 6 extend in the longitudinal direction L.

The composite tube 1 comprises wave valleys 7 and wave crests 8, which alternate in the longitudinal direction L and of which only two each are provided with a reference sign in FIG. 1. The wave valleys 7 and wave crests 8 are arranged in such a way that one wave crest 8 is respectively arranged between two wave valleys 7 and one wave valley 7 is respectively arranged between two wave crests 8. The wave valleys 7 and the wave crests 8 are provided on the composite tube 1 both on the outside and on the inside, i.e., facing the internal space I. For example, the wave valleys 7 and the wave crests 8 can be molded, after extrusion of the composite tube 1, onto the composite tube 1 by means of a so-called corrugator. The composite tube 1 has a smaller outer diameter at the wave valleys 7 than at the wave crests 8.

As FIG. 2 shows, the composite tube 1 may be provided with a corrugation 9 on the outside at least on the wave crests 8. In the peripheral direction U1, the corrugation 9 extends completely around the composite tube 1. The corrugation 9 is formed by first wall sections 10 and second wall sections 11, of which only two each are provided with a reference sign in FIG. 2, being arranged alternately next to one another in the peripheral direction U1. In this case, the first wall sections 10 extend in the radial direction R1 beyond the second wall sections 11. That is to say, the second wall sections 11 are recessed in the radial direction R1 with respect to the first wall sections 10.

Preferably provided is any number of first wall sections 10 and of second wall sections 11, which are arranged alternately in the peripheral direction U1 and are distributed evenly. The number of first wall sections 10 preferably matches the number of second wall sections 11. The corrugation 9 is preferably only provided in the region of the wave crests 8 and not in the region of the wave valleys 7.

The first wall sections 10 are manufactured from a first plastic material, and the second wall sections 11 are manufactured from a second plastic material differing from the first plastic material. The second plastic material is in particular softer than the first plastic material. The second plastic material may, for example, have a Shore A hardness in a range of preferably 10 to 70, and the first plastic material may, for example, have a Shore D hardness in a range of preferably 40 to 90.

In the peripheral direction U1, one first wall section 10 and one second wall section 11 are respectively arranged alternately next to one another. The first wall sections 10 and the second wall sections 11 extend in the longitudinal direction L and are arranged in parallel to one another. The first wall sections 10 and the second wall sections 11 in particular extend in parallel to the axis of symmetry M1. The first wall sections 10 and the second wall sections 11 extend in the radial direction R1 over an entire wall thickness W of the composite tube 1. This is to be understood to mean that as viewed in the radial direction R1, the first wall sections 10 are only formed with the first plastic material and the second wall sections 11 are only formed with the second plastic material. This in particular also means that the first plastic material and the second plastic material are arranged not one above the other as viewed in the radial direction R1 but preferably exclusively next to one another as viewed in the peripheral direction U1.

Due to the flexibly deformable, second wall sections 11 distributed evenly in the peripheral direction U1, the composite tube 1 is very flexible, without this flexibility being affected by the first wall sections 10 manufactured from the harder first plastic material. The second wall sections 11, which are manufactured from the softer, second plastic material, can in particular be selected and designed very specifically in view of the desired flexibility of the composite tube 1.

In contrast, the first wall sections 10, which are manufactured from the harder first plastic material and which protrude in the radial direction R1 beyond the second wall sections 11, are responsible for processes that are triggered by moved surfaces adjacent thereto, wherein these surfaces can also be designed specifically by a suitable material selection in view of the desired friction properties as well as the wear resistance, without these adjacent surfaces affecting the properties of the second wall sections 11, which have a lower hardness.

In deviation from the embodiment shown in FIGS. 1 and 2, the composite tube 1 can have the most varied geometries. For example, the composite tube 1 may also be designed as a smooth tube. The composite tube 1 may have more than two different plastic materials. For example, the composite tube 1 may have three, four, five or more than five different plastic materials. In this case, the composite tube 1 also has more than two different wall sections 10, 11. For example, the composite tube 1 may have three, four, five or more than five different wall sections 10, 11.

Figure 3:
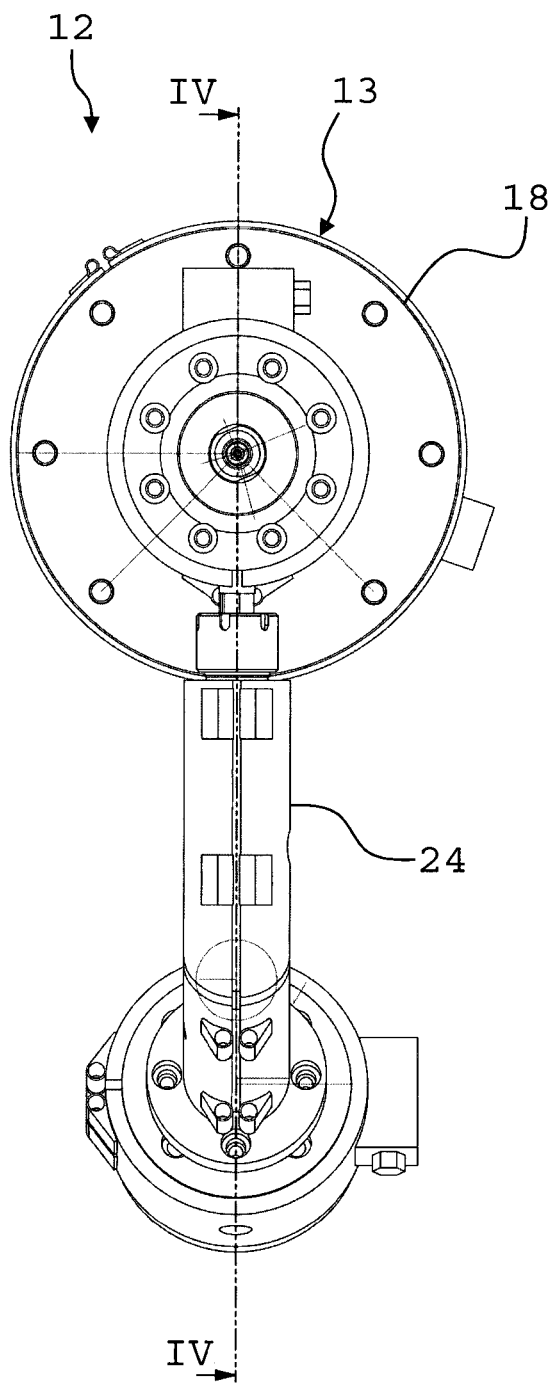
FIG. 3 shows a schematic front view of an embodiment of a multi-component-extrusion system.
Figure 4:
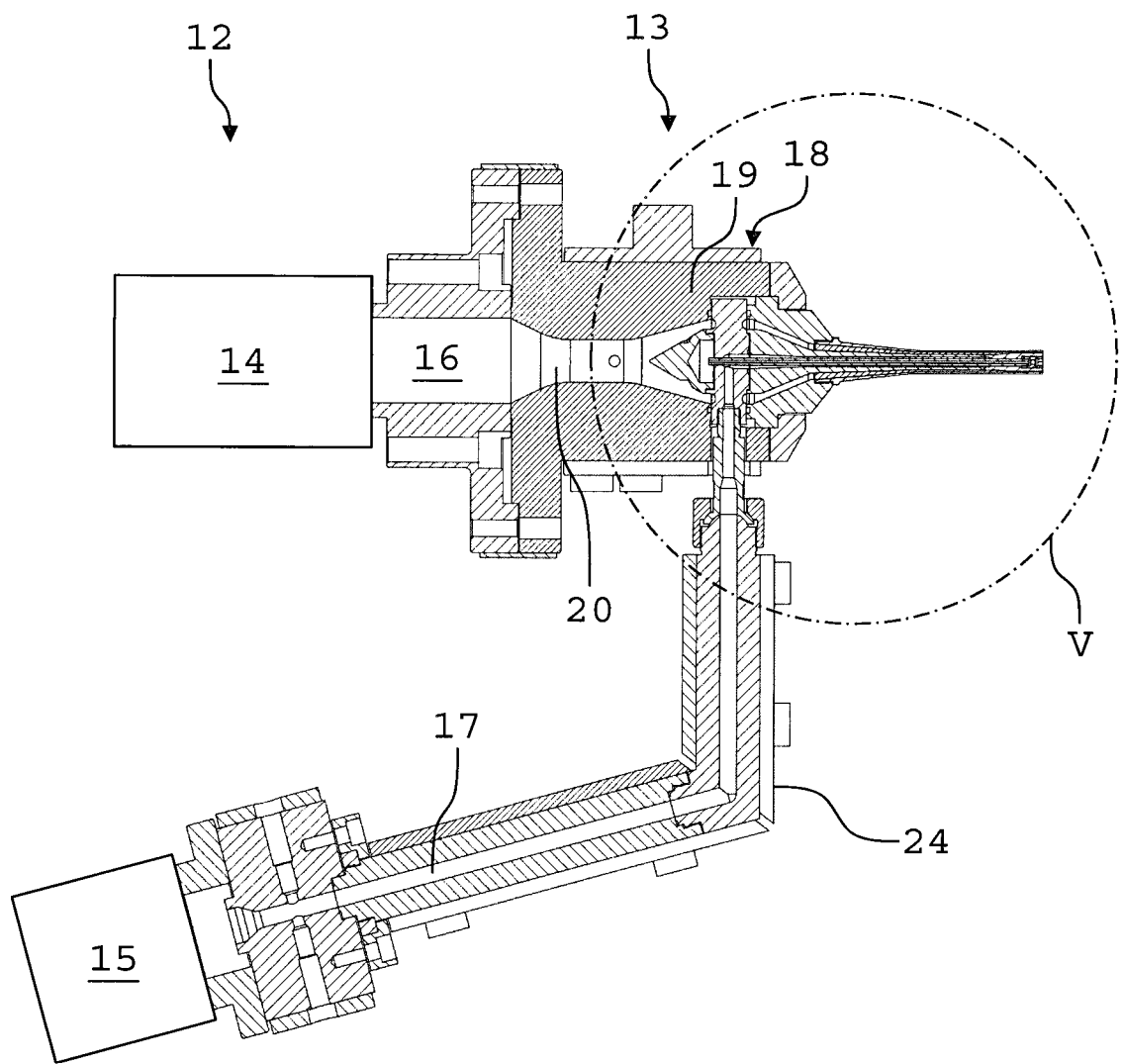
FIG. 4 shows a schematic sectional view of the multi-component extrusion system according to the cutting line IV-IV of FIG. 3.
Figure 5:
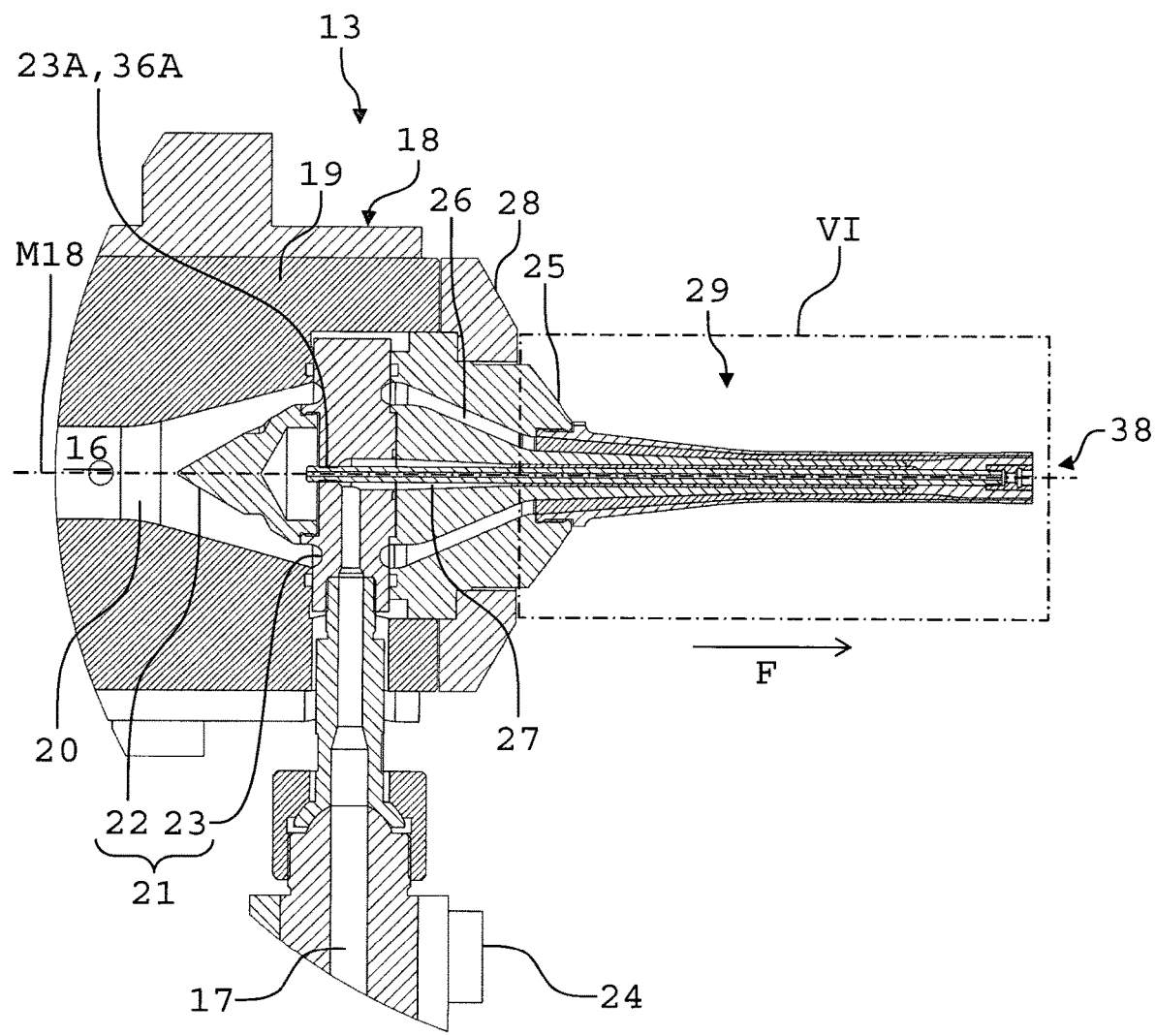
FIG. 5 shows the detailed view V according to FIG. 4.
Figure 6:
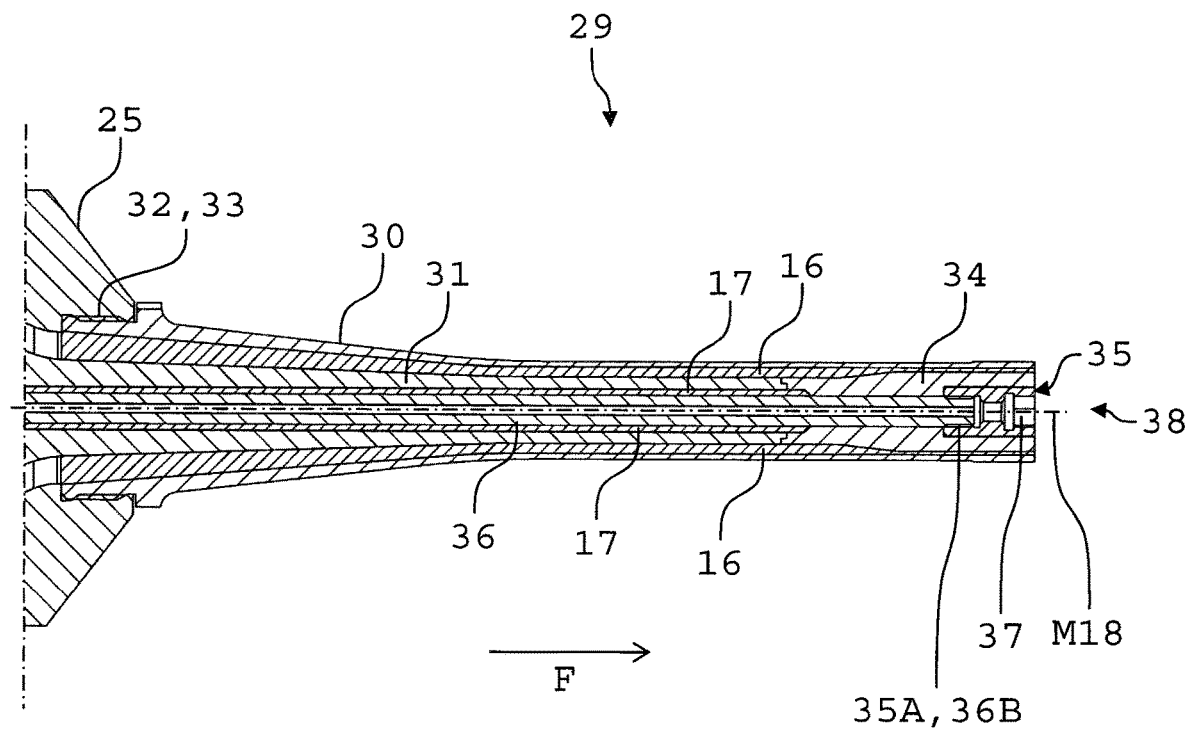
FIG. 6 shows the detailed view VI according to FIG. 5.
Figure 7:
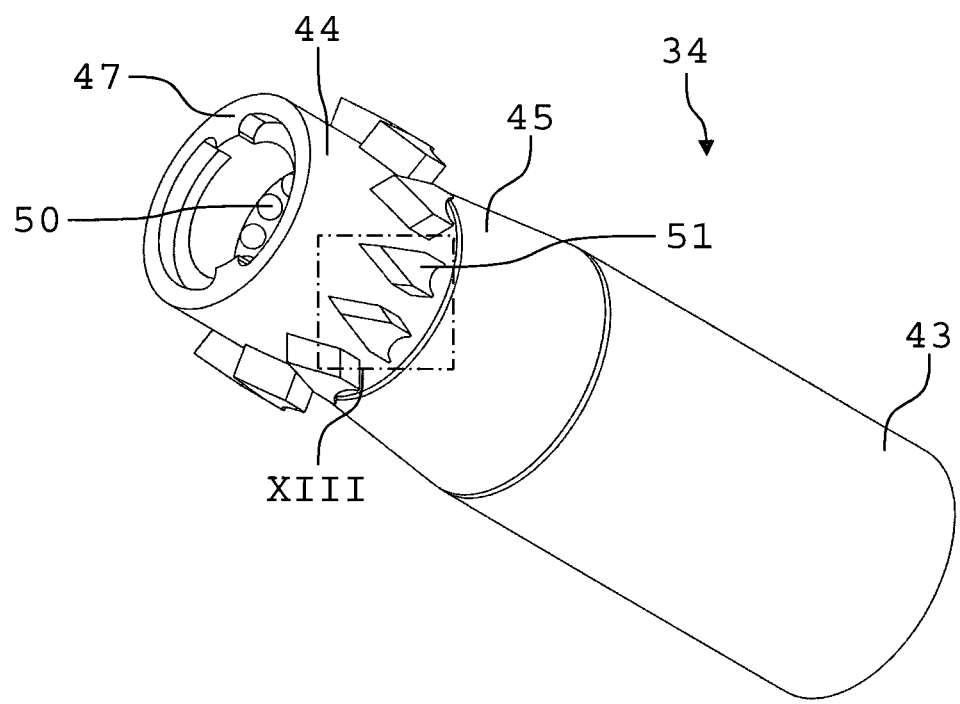
FIG. 7 shows a schematic perspective view of an embodiment of a melt flow distributor device for the multi-component-extrusion system according to FIG. 1.
Figure 8:
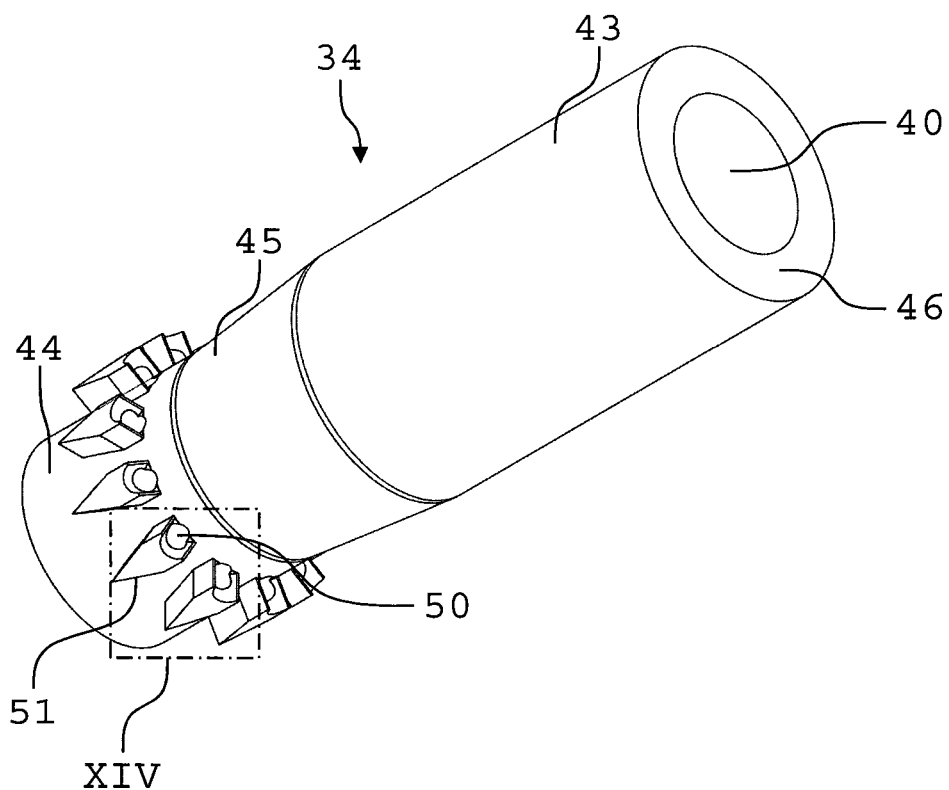
FIG. 8 shows another schematic perspective view of the melt flow distributor device according to FIG. 7.
Figure 9:
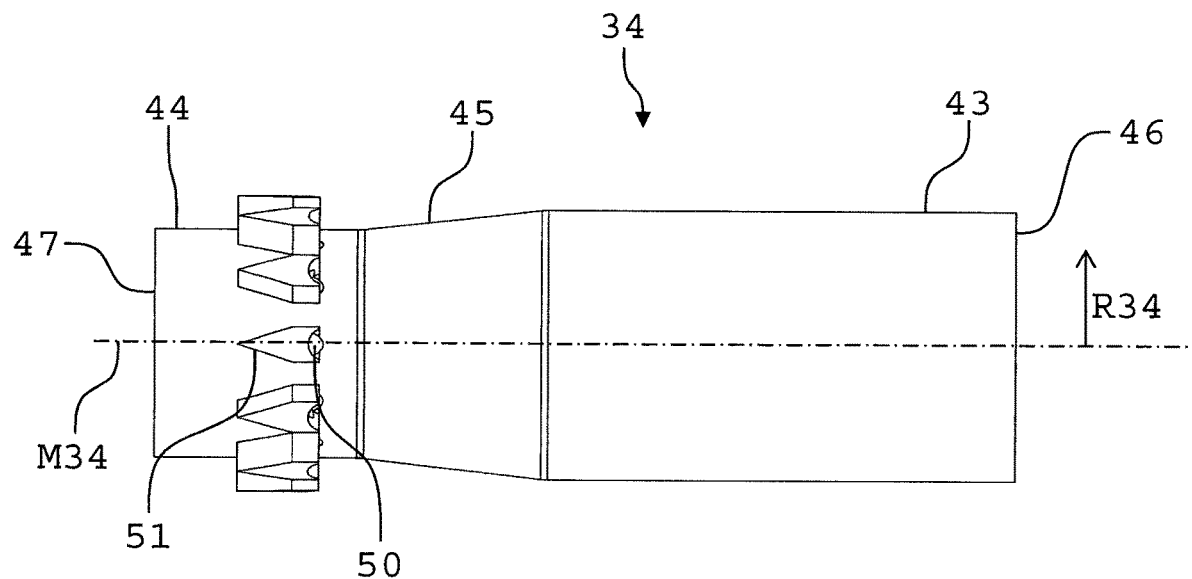
FIG. 9 shows a schematic lateral view of the melt flow distributor device according to FIG. 7.
Figure 10:
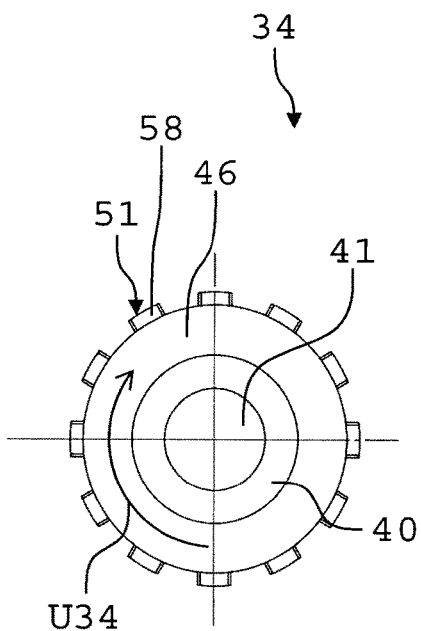
FIG. 10 shows a schematic front view of the melt flow distributor device according to FIG. 7.
Figure 11:
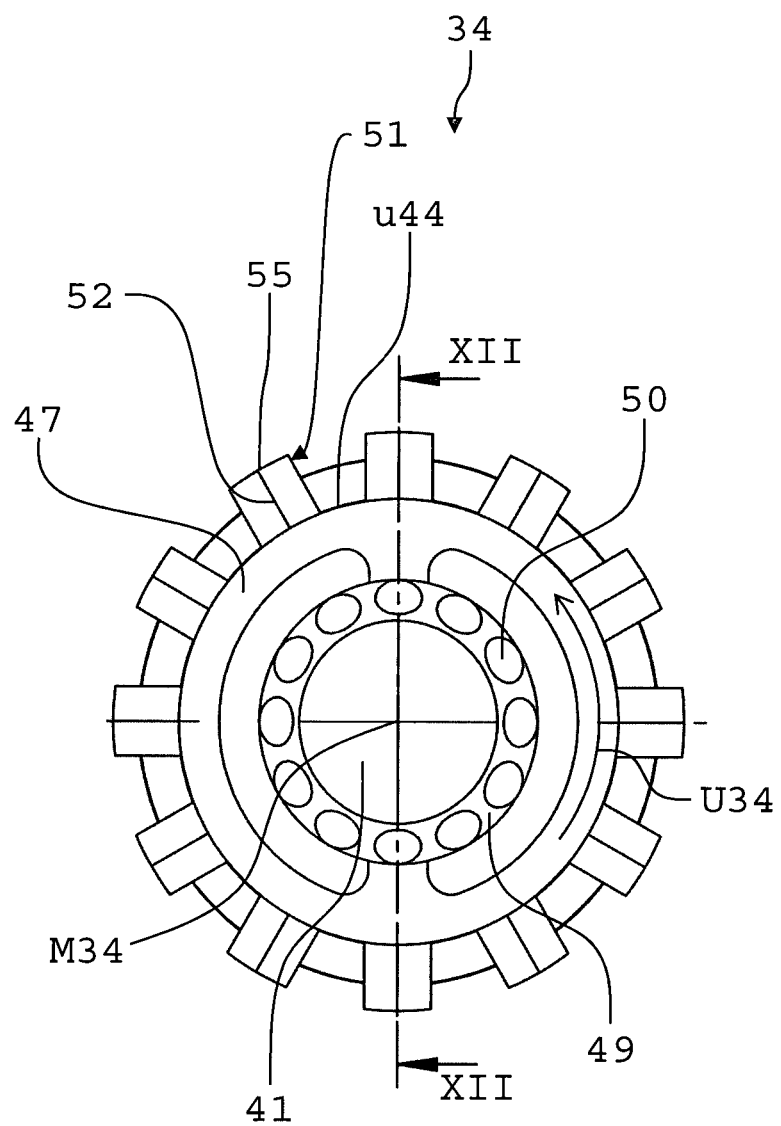
FIG. 11 shows a schematic rear view of the melt flow distributor device according to FIG. 7.

FIG. 3 shows a schematic front view of an embodiment of a multi-component extrusion system 12 for producing such a composite tube 1. FIG. 4 shows a schematic sectional view of the multi-component extrusion system 12 according to the cutting line IV-IV of FIG. 3. FIG. 5 shows the detailed view V according to FIG. 4, and FIG. 6 shows the detailed view VI according to FIG. 5. Below, reference is simultaneously made to FIGS. 3 to 6.

Multi-component extrusion system 12 comprises a multi-component extrusion die head 13. The multi-component extrusion die head 13 is configured for processing at least two different plastic materials, for example the aforementioned first plastic material and the second plastic material. The multi-component extrusion die head 13 can however also be configured for processing more than two plastic materials, for example three, four, five or more than five different plastic materials. For example, the multi-component extrusion die head 13 can be a two-component extrusion die head. The multi-component extrusion system 12 may comprise a corrugator (not shown) for molding the wave valleys 7 and wave crests 8 onto the composite tube 1.

The multi-component extrusion die head 13 is part of the multi-component extrusion system 12. The multi-component extrusion system 12 comprises a main extruder 14 for plasticizing the first plastic material and an ancillary extruder 15 for plasticizing the second plastic material. The multi-component extrusion system 12 may however have any number of ancillary extruders 15.

The main extruder 14 is configured for plasticizing the first plastic material and supplying the multi-component extrusion die head 13 with a first melt flow 16. The ancillary extruder 15 is configured for plasticizing the second plastic material and supplying the multi-component extrusion die head 13 with a second melt flow 17. The multi-component extrusion die head 13 comprises a main die head 18, which has a base body 19, which is designed to be substantially rotation-symmetrical with respect to a center axis or axis of symmetry M18 of the main die head 18.

In the center of the base body 19 and rotation-symmetrically with respect to the axis of symmetry M18 is provided a bore 20, through which the first melt flow 16 is supplied to a torpedo 21 of the main die head 18. The torpedo 21 comprises a melt distributor 22 and a distributor plate 23, which is connected to the melt distributor 22. The distributor plate 23 comprises a centrally drilled threaded bore 23A. The second melt flow 17 is supplied to the distributor plate 23 by means of a melt supply line 24.

The multi-component extrusion die head 13 furthermore comprises a nozzle holder 25 arranged downstream of the torpedo 21. The nozzle holder 25 comprises a first channel 26 for the first melt flow 16 and a second channel 27 for the second melt flow 17. The channels 26, 27 may extend rotation-symmetrically around the axis of symmetry M18. In this case, the second channel 27 may be arranged within the first channel 26. The distributor plate 23 supplies the first melt flow 16 to the first channel 26 and the second melt flow 17 to the second channel 27. The multi-component extrusion die head 13 furthermore comprises a mounting plate 28 for mounting the nozzle holder 25 on the base body 19. The mounting plate 28 may, for example, be screwed to the base body 19.

The multi-component extrusion die head 13 furthermore comprises an extrusion nozzle 29, which comprises an outer nozzle 30 as well as an inner nozzle 31 arranged within the outer nozzle 30. The outer nozzle 30 and the inner nozzle 31 are designed to be rotation-symmetrical with respect to the axis of symmetry M18. The outer nozzle 30 is screwed to the nozzle holder 25. To this end, an internal thread 32 may be provided on the nozzle holder 25 and a corresponding external thread 33 may be provided on the outer nozzle 30.

The inner nozzle 31 is mounted to the distributor plate 23 of the torpedo 21 by means of a melt flow distributor device 34, a mounting element 35, which comprises a threaded bore 35A, and a mounting rod 36, which passes through the inner nozzle 31. To this end, the mounting rod 36 respectively comprises at its end sections an external thread 36A, 36B. The external thread 36A is screwed into the threaded bore 23A of the distributor plate 23, and the external thread 36B is screwed into the threaded bore 35A of the mounting element 35. The mounting rod 36 passes centrally through the inner nozzle 31, wherein the melt flow distributor device 34 is attached to the mounting rod 36 on the front side. The mounting element 35 is again received in the melt flow distributor device 34. The mounting element 35 comprises a mounting section 37, for example a hexagon socket.

By means of the torpedo 21 and the nozzle holder 25, the main die head 18 is now configured for supplying the extrusion nozzle 29 with the first melt flow 16 and the second melt flow 17. In the process, the first melt flow 16 and the second melt flow 17 are guided separately from one another in the extrusion nozzle 29 in a conveying direction F oriented away from the main die head 18 in the direction of a nozzle outlet 38 of the extrusion nozzle 29. That is to say, the first melt flow 16 does not mix with the second melt flow 17 while they are conveyed in the conveying direction F. The conveying direction F is parallel to the axis of symmetry M18. In this case, the first melt flow 16 is guided between the outer nozzle 30 and the inner nozzle 31 and the second melt flow 17 is guided between the inner nozzle 31 and the mounting rod 36.

The melt flow distributor device 34 shown in FIGS. 7 to 14 is arranged outside the main die head 18 and within the extrusion nozzle 29. That is to say, the melt flow distributor device 34 is positioned at a distance from the main die head 18. The melt flow distributor device 34 may be designed to be rotation-symmetrical with respect to a center axis or axis of symmetry M34. The axis of symmetry M34 may correspond to the axis of symmetry M18. The melt flow distributor device 34 comprises a base body 39 with a central receiving region 40, in which the mounting element 35 can be received.

The base body 39 furthermore comprises a central bore 41, through which the mounting rod 36 passes. A diameter d40 of the receiving region 40 is in this case larger than an inner diameter d41 of the bore 41. A face side 42 of the receiving region 40 serves as counter bearing for the mounting element 35. The base body 39 comprises a first cylindrical outer surface 43 as well as a second cylindrical outer surface 44. The outer surfaces 43, 44 are designed to be rotation-symmetrical with respect to the axis of symmetry M34 and have a circular cylindrical geometry. Between the first outer surface 43 and the second outer surface 44 is provided a frustoconical third outer surface 45. An outer diameter d43 of the first outer surface 43 is larger than an outer diameter d44 of the second outer surface 44. The second outer surface 44 transitions via the third outer surface 45 into the first outer surface 43.

The base body 39 furthermore comprises a first side or front side 46, which faces away from the main die head 18, and a second side or rear side 47, which faces the main die head 18. The inner nozzle 31 also abuts against the rear side 47 on the face side. The front side 46 in particular forms a part of the nozzle outlet 38 and is flush therewith.

In the base body 39 is furthermore provided a melt receiving section 48 for the second melt flow 17, through which melt receiving section the mounting rod 36 passes. An inner diameter d48 of the melt receiving section 48 is larger than the inner diameter d41 of the bore 41. The inner diameter d41 may in this case substantially correspond to an outer diameter d36 of the mounting rod 36. The outer diameter d36 is preferably slightly smaller than the inner diameter d41. That is to say, when the mounting rod 36 passes through the melt receiving section 48, a cavity, which receives the second melt flow 17, of annular cross-section is provided peripherally around the mounting rod 36.

Between the melt receiving section 48 and the bore 41 is provided a frustoconical melt diverting section 49. The melt diverting section 49 comprises at least one but preferably a plurality of bores 50, which lead from the melt receiving section 48 to the second outer surface 44 of the base body 39. The number of bores 50 is arbitrary. For example, twelve such bores 50 may be provided. However, less or more than twelve such bores 50 may also be provided. The bores 50 are respectively inclined at an angle of inclination α in relation to the axis of symmetry M34. The angle of inclination α is, for example, 30° to 50°, preferably 35° to 45°, more preferably 40°. The magnitude of the angle of inclination α is however arbitrary. The bores 50 may also be called channels.

To each bore 50 is assigned a melt distributor 51, which is attached to the outside of the second outer surface 44 of the base body 39. A plurality of melt distributors 51 is preferably provided. The melt distributors 51 are in particular designed as a single piece of material with the base body 39. The melt distributors 51 may also be called islands. The number of melt distributors 51 preferably matches the number of second bores 50. For example, twelve such melt distributors are provided. The bores 50 are arranged in such a way that they respectively pass through one of the melt distributors 51 at least in sections.

Each melt distributor 51 comprises a front edge 52 and two side walls 53, 54 extending in the shape of a V away from the front edge 52. The front edge 52 is arranged orthogonally to the axis of symmetry M34 but may also be at an incline thereto. Each melt distributor 51 furthermore comprises an outer surface 55. The outer surfaces 55 of all melt distributors 51 are arranged on a circular path. An outer diameter d51 of the melt distributors 51 substantially corresponds to an inner diameter d30 of the outer nozzle 30. The outer diameter d51 is preferably slightly smaller than the inner diameter d30. Two additional side walls 56, 57 extending in parallel to and at a distance from one another are connected to the side walls 53, 54.

The bores 50 and the melt distributors 51 are evenly distributed over a periphery u44 of the second outer surface 44. The bores 50 and the melt distributors 51 are in particular positioned next to one another as viewed in a peripheral direction U34 of the melt flow distributor device 34. The peripheral direction U34 may in this case be oriented clockwise or counterclockwise. The peripheral direction U34 is in particular positioned in parallel to the first outer surface 43 and the second outer surface 44. The melt flow distributor device 34 also has a radial direction R34, which is oriented away from the axis of symmetry M34 in the direction of the outer surfaces 43, 44. The radial direction R34 is positioned orthogonally to the axis of symmetry M34.

Each melt distributor 51 comprises a rear wall 58, which may be curved in an arc shape, in particular a circular arc shape. Each bore 50 penetrates at least partially through the rear wall 58 of the melt distributor 51 assigned to said bore. That is to say, the bores 50 are at least partially laterally shielded by the side walls 56, 57. The rear wall 58 may also be designed to be flat or V-shaped.

The functionality of the melt flow distributor device 34 is explained below. The melt flow distributor device 34 is configured for splitting the first melt flow 16 in the peripheral direction U34 into any number of sections by means of the melt distributors 51. The number of sections in this case matches the number of melt distributors 51. The second melt flow 17 can furthermore be supplied to the split first melt flow 16 by means of the bores 50 in such a way that at least one section of the second melt flow 17 is arranged within the first melt flow 16 as viewed in the peripheral direction U34.

Figure 12:
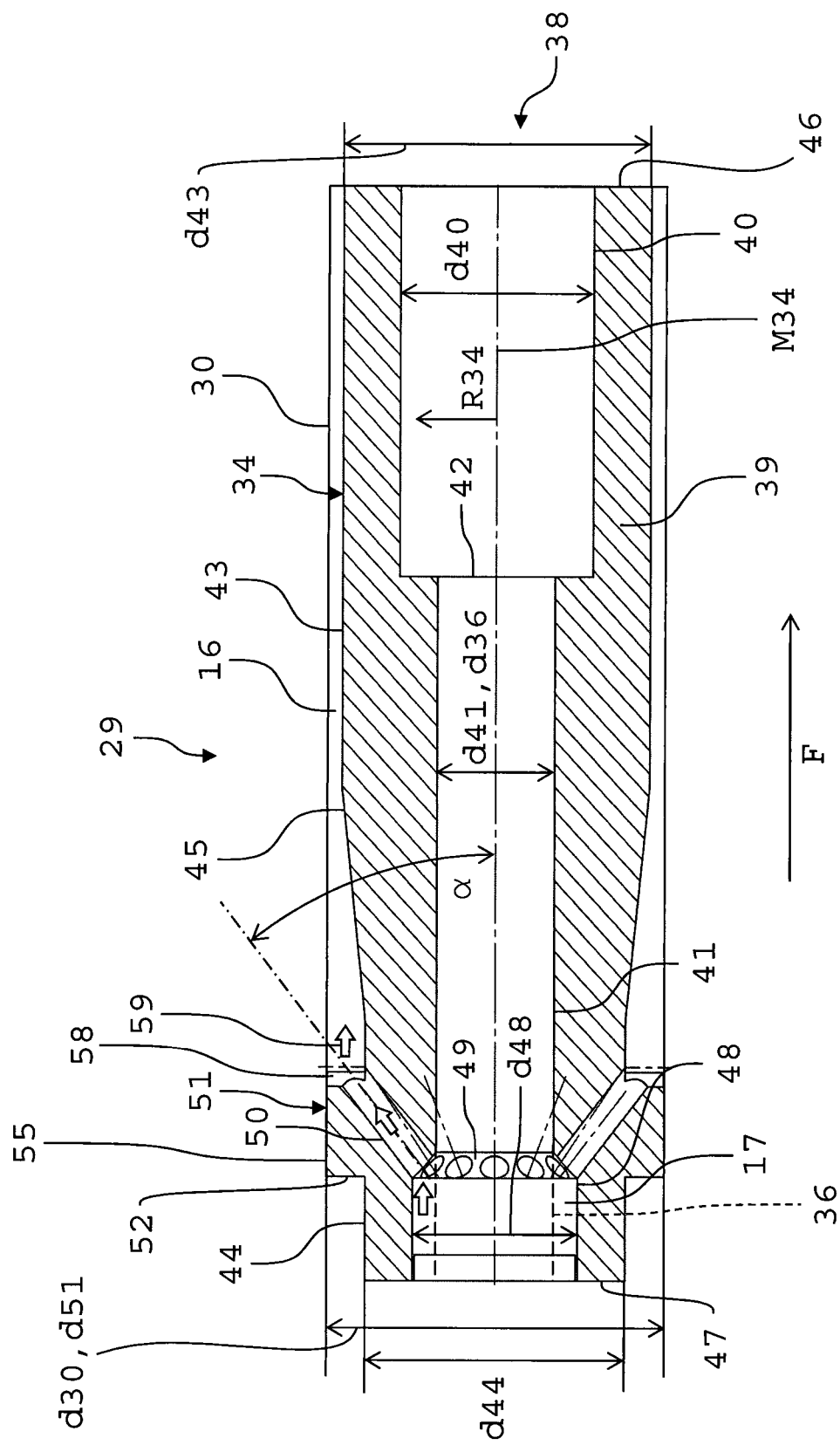
FIG. 12 shows a schematic sectional view of the melt flow distributor device according to the cutting line XII-XII of FIG. 11.
Figure 13:
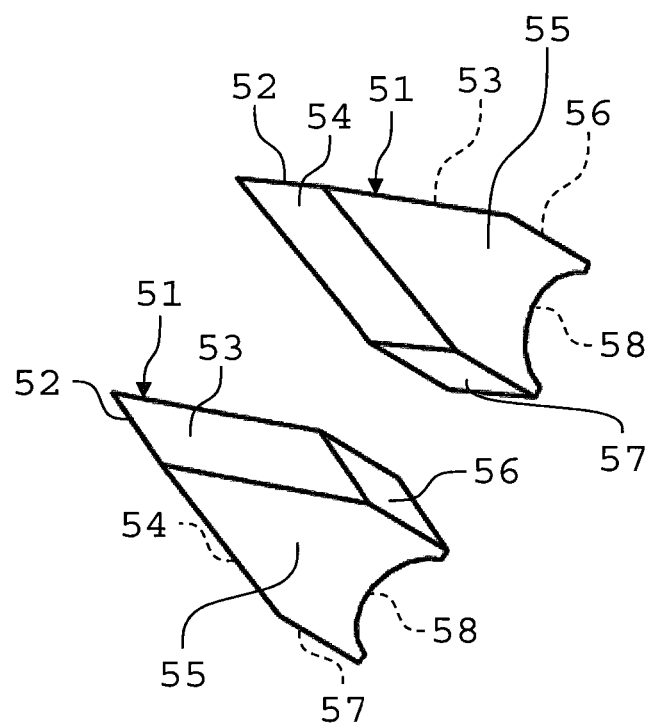
FIG. 13 shows the detailed view XIII according to FIG. 7.
Figure 14:
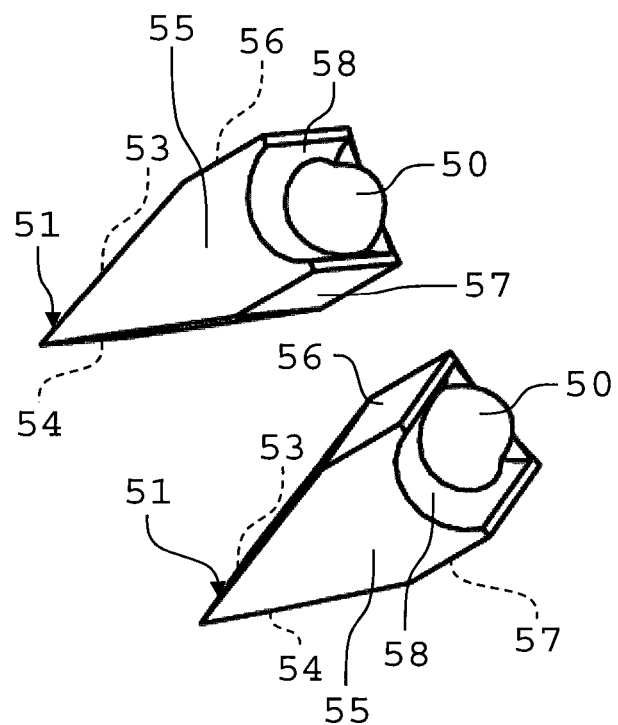
FIG. 14 shows the detailed view XIV according to FIG. 8.

In this case, the first melt flow 16 is split at the respective front edges 52 of the melt distributors 51 and is pushed away laterally in the peripheral direction U34 by means of the side walls 53, 54. As a result of the bores 50 being provided on the rear side on the melt distributors 51, the second melt flow 17 is peripherally introduced in a manner split between the split first melt flow 16. The guiding of the second melt flow 17 is indicated in FIG. 12 by means of arrows 59.

Figure 15:
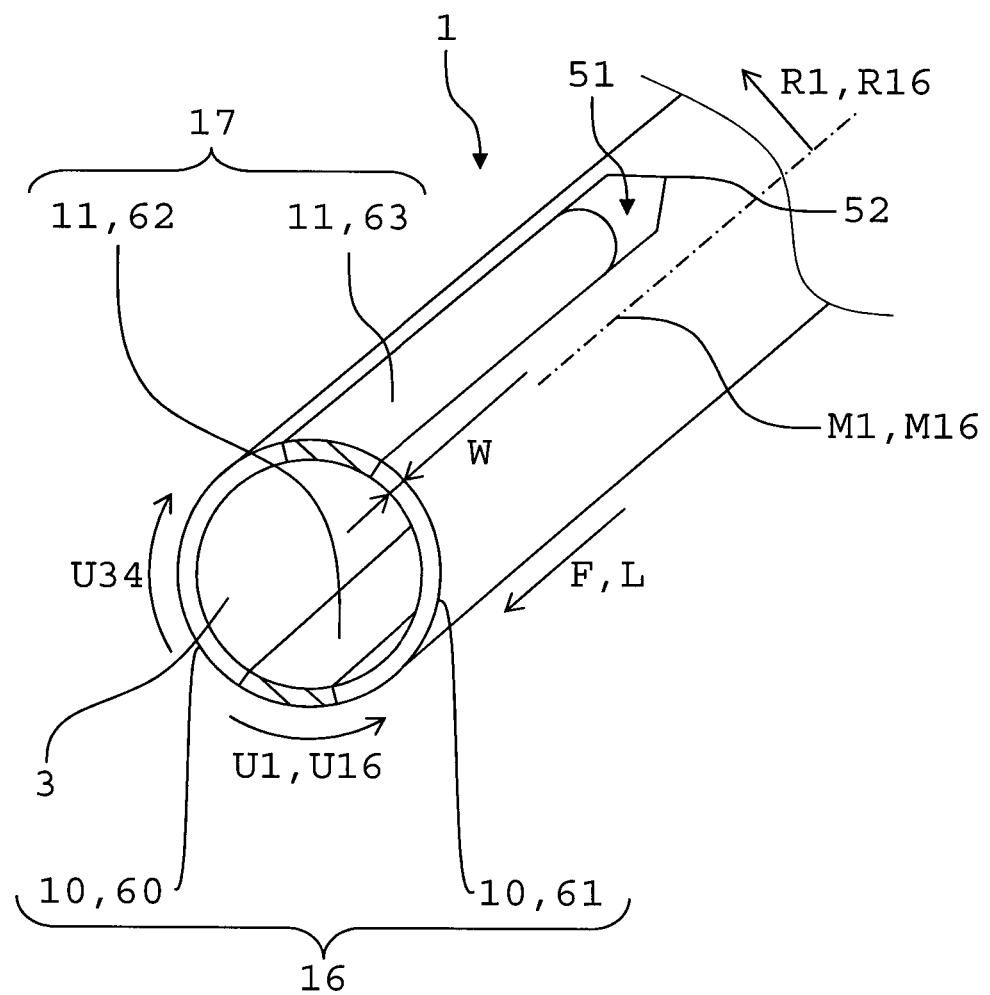
FIG. 15 shows a schematic perspective view of another embodiment of a composite tube.

In this respect, FIG. 15 shows, for example, a composite tube 1, which is manufactured with the multi-component die head 13. The composite tube 1 is shown as a smooth tube. The composite tube 1 may however also have the alternately arranged wave valleys 7 and wave crests 8 shown in FIG. 1. In this exemplary embodiment, the melt flow distributor device 34 comprises only two melt distributors 51 arranged at an offset from one another of 180°. As FIG. 15 shows, the front edge 52 of the respective melt distributor 51 distributes the first melt flow 16 into a first section 60 and into a second section 61. The first section 60 and the second section 61 form two first wall sections 10 of the composite tube 1. The conveying direction F may correspond to the longitudinal direction L.

The first melt flow 16 may be designed to be rotation-symmetrical with respect to a center axis or axis of symmetry M16, which may correspond to the axis of symmetry M1. The first melt flow 16 has a peripheral direction U16, which may be oriented clockwise or counterclockwise. For example, the peripheral direction U16 is oriented counter-clockwise. The peripheral direction U16 may correspond to the peripheral direction U1. The peripheral direction U16 is preferably positioned in parallel to the inner wall 3 of the composite tube 1. The peripheral direction U16 may be oriented in the opposite direction to or in the same direction as the peripheral direction U34. A radial direction R16 of the first melt flow 16 is oriented orthogonally to the axis of symmetry M16. The radial direction R16 may correspond to the radial direction R1.

By means of the bores 50 of the melt distributors 51, the second melt flow 17 is supplied to the first melt flow 16 in such a way that two sections 62, 63, in particular a first section 62 and a second section 63, of the second melt flow 17 are arranged between the sections 60, 61 of the first melt flow 16 as viewed in the peripheral direction U16. The first section 62 and the second section 63 form two second wall sections 11 of the composite tube 1. As viewed in the radial direction R16, the sections 62, 63 of the second melt flow 17 are arranged outside the sections 60, 61 of the first melt flow 16 and in particular not one above the other.

By means of the multi-component extrusion die head 13, optimal material guidance of the two melt flows 16, 17 is ensured. Optimal material distribution is furthermore ensured, wherein the sections 60 to 63 of the melt flows 16, 17 extend in parallel to one another as viewed in the conveying direction F and are positioned next to one another in the peripheral direction U1 of the composite tube 1, the peripheral direction U16 of the first melt flow 16 or the peripheral direction U34 of the melt flow distributor device 34. A short residence time of the various plastic materials in the multi-component extrusion die head 13 results, whereby material damage is avoided. By means of the multi-component extrusion die head 13, various possibilities of axially extruding several components, in particular different plastic materials, result. As a result of the melt flow distributor device 34 being arranged directly on the nozzle outlet 38, said melt flow distributor device can be exchanged very quickly.

Figure 16:
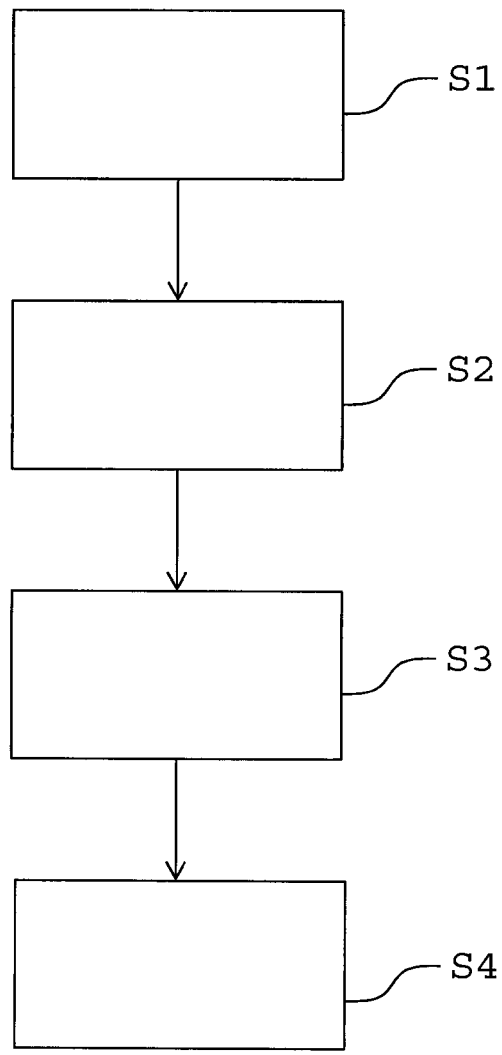
FIG. 16 shows a schematic block diagram of an embodiment of a method for producing a composite tube according to FIG. 1 or FIG. 15.

FIG. 16 shows a schematic block diagram of an embodiment of a method for producing a composite tube 1 by means of the multi-component extrusion die head 13. In a step S1, the first melt flow 16 and the second melt flow 17 are supplied to the extrusion nozzle 29 by means of the main die head 18. In a step S2, the first melt flow 16 and the second melt flow 17 are guided separately from one another in the extrusion nozzle 29 in a conveying direction F oriented away from the main die head 18 in the direction of the nozzle outlet 38. Step S2 is preferably performed after step S1.

In a step S3, the first melt flow 16 is split in the peripheral direction U16 by means of the melt flow distributor device 34 arranged in the extrusion nozzle 29 and outside the main die head 18. The first melt flow 16 is in this case split by means of the melt distributors 51. The number of melt distributors 51 determines into how many sections 60, 61 the first melt flow 16 is split. For example, the first melt flow 16 is split into twelve sections 60, 61.

In a step S4, the second melt flow 17 is supplied to the split first melt flow 16 by means of the melt flow distributor device 34. In the process, at least one section 62, 63 of the second melt flow 17 is arranged within the first melt flow 16 in the peripheral direction U16. The term "within" is to be understood here to mean that at least one section 62, 63 of the second melt flow 17 is arranged between two sections 60, 61 of the first melt flow 16 as viewed in the peripheral direction U16. For the case that the melt flow distributor device 34 only comprises one melt distributor 51, the first melt flow 16 may also be split into only one section 60, 61, which is not closed peripherally but has a gap which extends along the conveying direction F and in which the at least one section 62, 63 of the second melt flow 17 is arranged.

The at least one section 62, 63 of the second melt flow 17 is in particular arranged between two sections 60, 61 of the first melt flow 16 in the peripheral direction U16. The first melt flow 16 preferably has a plurality of sections 60, 61, for example twelve sections 60, 61, and the second melt flow 17 also has a plurality of sections 62, 63, for example also twelve sections 62, 63. The sections 60, 61 of the first melt flow 16 and the sections 62, 63 of the second melt flow 17 are arranged alternately in the peripheral direction U16 in such a way that one section 60, 61 of the first melt flow 16 is always arranged between two sections 62, 63 of the second melt flow 17.

By means of the melt distributors 51, the first melt flow 16 can be split in such a way and the second melt flow 17 can be supplied to the split first melt flow 16 in such a way that the sections 60, 61, 62, 63 of the first melt flow 16 and of the second melt flow 17 respectively extend in the radial direction R1 of the composite tube 1 over a total wall thickness W thereof. That is to say, the sections 60, 61, 62, 63 are not positioned one above the other as viewed in the radial direction R1 or in the radial direction R16 but are respectively positioned next to one another in the peripheral direction U16 of the first melt flow 16 or the peripheral direction U1 of the composite tube 1.

Although the present invention was described based on exemplary embodiments, it can be modified in various ways.

LIST OF REFERENCE CHARACTERS

1 Composite tube
2 Wiring harness
3 Inner wall
4 Cable
5 Cable
6 Cable
7 Wave valley
8 Wave crest
9 Corrugation
10 Wall section
11 Wall section
12 Multi-component extrusion system
13 Multi-component extrusion die head
14 Main extruder
15 Ancillary extruder
16 Melt flow
17 Melt flow
18 Main die head
19 Base body
20 Bore
21 Torpedo
22 Melt distributor
23 Distributor plate
23A Threaded bore
24 Melt supply line
25 Nozzle holder
26 Channel
27 Channel
28 Mounting plate
29 Extrusion nozzle
30 Outer nozzle
31 Inner nozzle
32 Internal thread
33 External thread
34 Melt flow distributor device
35 Mounting element
35A Threaded bore
36 Mounting rod
36A External thread
36B External thread
37 Mounting section
38 Nozzle outlet
39 Base body
40 Receiving region
41 Bore
42 Face side
43 Outer surface
44 Outer surface
45 Outer surface
46 Front side
47 Rear side
48 Melt receiving section
49 Melt diverting section
50 Bore
51 Melt distributor
52 Front edge
53 Side wall
54 Side wall
55 Outer surface
56 Side wall 57 Side wall
58 Rear wall
59 Arrow
60 Section
61 Section
62 Section
63 Section
d30 Inner diameter
d36 Outer diameter
d41 Inner diameter
d43 Outer diameter
d44 Outer diameter
d48 Inner diameter
d51 Outer diameter
F Conveying direction
I Internal space
L Longitudinal direction
M1 Axis of symmetry
M16 Axis of symmetry
M18 Axis of symmetry
M34 Axis of symmetry
R1 Radial direction
R16 Radial direction
R34 Radial direction
U1 Peripheral direction
U16 Peripheral direction
U34 Peripheral direction
u44 Periphery
W Wall thickness
α Angle of inclination

The invention claimed is:

1. A multi-component extrusion die head for producing a composite tube, comprising:
an extrusion nozzle,
a main die head which is configured for supplying the extrusion nozzle with a first melt flow and a second melt flow, wherein the first melt flow and the second melt flow are guided separately from one another in the extrusion nozzle in a conveying direction oriented away from the main die head in the direction of a nozzle outlet of the extrusion nozzle, and
a melt flow distributor device which is arranged in the extrusion nozzle and outside the main die head, the melt flow distributor device including at least one melt distributor that is configured for splitting the first melt flow in a peripheral direction thereof, and for supplying the second melt flow to the split first melt flow in such a way that at least one section of the second melt flow is arranged within the first melt flow in the peripheral direction, wherein
the melt flow distributor device is arranged in or on the nozzle outlet,
the melt flow distributor device comprises a body in which the at least one melt distributor is attached to an outer surface of the body,
the body of the melt flow distributor device extends toward the nozzle outlet and forms part of the nozzle outlet,
a mounting element which is configured to be reached from the nozzle outlet is provided in the melt flow distributor device, and
the melt flow distributor device is configured to be removed from the extrusion nozzle after releasing the mounting element without disassembling the main die head.

2. The multi-component extrusion die head according to claim 1, wherein a front side of the melt flow distributor device is flush with the nozzle outlet.

3. The multi-component extrusion die head according to claim 1, wherein the melt flow distributor device is mounted to the main die head by means of the mounting element and the mounting rod passed through the extrusion nozzle.

4. The multi-component extrusion die head according to claim 1, wherein the at least one melt distributor has a front edge as well as two side walls extending from the front edge in the conveying direction away from one another.

5. The multi-component extrusion die head according to claim 1, wherein the at least one melt distributor has a rear wall in the shape of an arc.

6. The multi-component extrusion die head according to claim 5, wherein the arc is a circular arc.

7. The multi-component extrusion die head according to claim 1, wherein the melt flow distributor device has at least one bore, which is configured for supplying the second melt flow to the split first melt flow.

8. The multi-component extrusion die head according to claim 7, wherein the at least one bore passes through the at least one melt distributor at least in sections.

9. The multi-component extrusion system with a multi-component extrusion die head according to claim 1, a main extruder for supplying the first melt flow to the main die head and an ancillary extruder for supplying the second melt flow to the main die head.

10. A method for producing a composite tube by means of a multi-component extrusion die head, comprising the steps:
supplying a first melt flow and a second melt flow to an extrusion nozzle by means of a main die head,
separately guiding the first melt flow and the second melt flow in the extrusion nozzle in a conveying direction oriented away from the main die head in the direction of a nozzle outlet of the extrusion nozzle,
splitting the first melt flow in a peripheral direction thereof by means of a melt flow distributor device including at least one melt distributor arranged in the extrusion nozzle and outside the main die head, wherein the melt flow distributor device is arranged in or on the nozzle outlet, and
supplying the second melt flow to the split first melt flow by means of the melt flow distributor device in such a way that at least one section of the second melt flow is arranged within the first melt flow in the peripheral direction, wherein
the melt flow distributor device comprises a body in which the at least one melt distributor is attached to an outer surface of the body,
the body of the melt flow distributor device extends toward the nozzle outlet and forms part of the nozzle outlet,
a mounting element which is configured to be reached from the nozzle outlet is provided in the melt flow distributor device, and
the melt flow distributor device is configured to be removed from the extrusion nozzle after releasing the mounting element without disassembling the main die head.

11. The method according to claim 10, wherein the at least one section of the second melt flow is arranged between two sections of the first melt flow in the peripheral direction.

12. The method according to claim 11, wherein the first melt flow has a plurality of sections and the second melt flow has a plurality of sections, and wherein the sections of the first melt flow and the sections of the second melt flow are arranged alternately in the peripheral direction in such a way that one section of the first melt flow is always arranged between two sections of the second melt flow and vice versa.

13. The method according to claim 11, wherein the first melt flow is split in such a way and the second melt flow is supplied to the split first melt flow in such a way that the sections of the first melt flow and of the second melt flow respectively extend in a radial direction of the composite tube over a total wall thickness thereof.

* * * * *